UNITED STATES PATENT OFFICE.

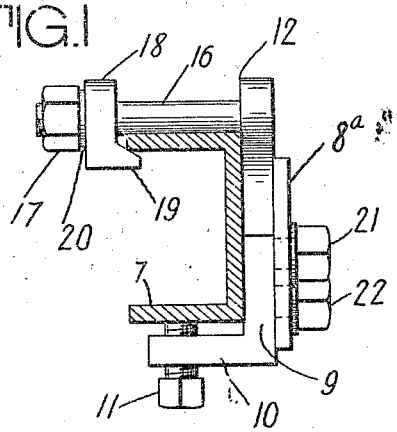
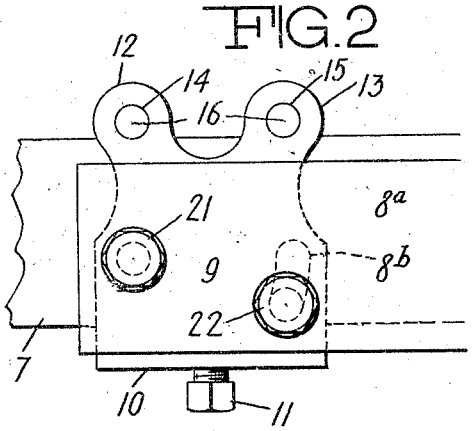
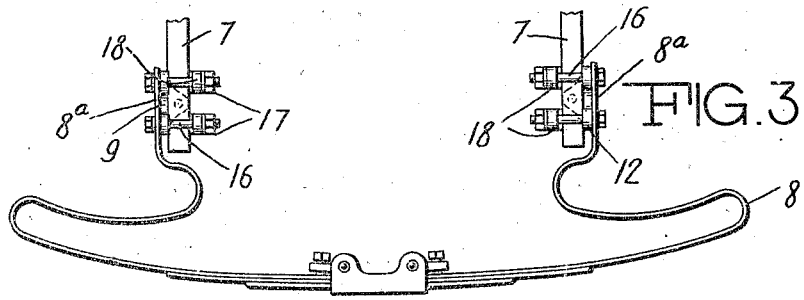
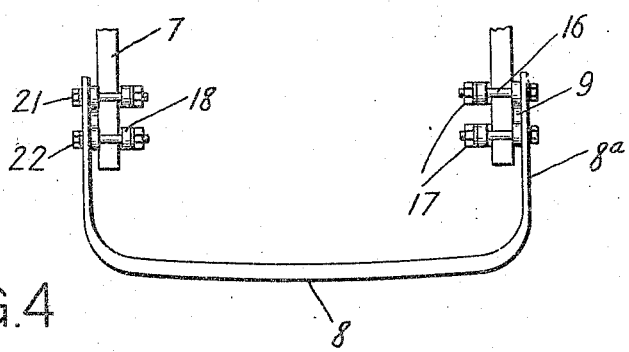

ARTHUR MAYER, OF RICHMOND HILL, NEW YORK, ASSIGNOR TO EDWARD V. HARTFORD, INC., A CORPORATION OF NEW YORK.

BUMPER.

1,329,670.   Specification of Letters Patent.   Patented Feb. 3, 1920.

Application filed June 22, 1916. Serial No. 105,123.

*To all whom it may concern:*

Be it known that I, ARTHUR MAYER, a citizen of the United States, residing at Richmond Hill, in the county of Queens and State of New York, have invented certain new and useful Improvements in Bumpers, of which the following, taken in connection with the accompanying drawings, is a full, clear, and concise description.

The present invention relates generally to improvements in bumpers for motor vehicles and is more particularly directed to means for attaching the bumper to a vehicle.

The principal object of my invention is to provide an attaching means, which may be secured to the vehicle with facility without in any way marring or changing the appearance thereof or effecting any alteration therein and may be made practically rigid with the vehicle frame, so as to hold firmly under the most severe strains or stresses to which it may be subjected.

A further object of my invention is to provide a device possessing the aforesaid characteristics, which will possess great durability and by reason of the minimum number of parts employed, may be economically produced, the various elements or members thereof coöperating so as to give a wide range of adjustability to my attachment, thus permitting of the production of a standard sized device, which will be suitable for employment in connection with vehicles of different types and dimensions.

My invention also comprehends an attaching device for bumpers for motor vehicles, wherein the thrust received thereby incident to the bumper having an impact delivered thereagainst will be partially taken up by the frame of the vehicle in a direction longitudinally thereof, thereby minimizing the strain on the vehicle frame and the attaching members, and adding to the life of all of the contacting parts.

Other objects and advantages of my invention will become manifest as the description proceeds and I would have it understood that I do not limit myself to the specific uses herein pointed out, nor to the particular details of construction shown and described, since, it is obvious that various changes in the structure thereof may be made to meet special conditions or requirements without departing from the spirit and scope of my invention.

I shall now proceed to describe my invention with reference to the accompanying drawings, and then point out with more particularity, the essential elements of novelty therein, in the appended claims.

In the drawings,

Figure 1 is a front elevation of my improved attaching device shown in position on the frame of a motor vehicle.

Fig. 2 is a side elevation of the structure shown in Fig. 1.

Fig. 3 is a top plan view showing fragments of the frame of a motor vehicle to which a spring bumper is secured by my improved attaching means, and Fig. 4 is a view similar to Fig. 3, wherein in lieu of the spring bumper, a bumper of the fixed type is shown.

Referring now to the drawings in detail, in which like characters of reference are employed to designate similar parts throughout the several views, 7 represents one of the longitudinal channel bars of a motor vehicle frame, the forward ends of which are customarily curved downwardly to form, what is termed, the nose, on which the bumper 8 is customarily supported. In Fig. 3, I have shown the bumper of the spring type, such, for instance as disclosed in the patent of Michael J. Maguth, granted August 15, 1916, No. 1,194,405 for automobile bumpers; while, in Fig. 4 I have illustrated my invention used in conjunction with a bumper of the rigid type, such as customarily used on trucks and heavy vehicles.

My improved attaching means comprises a bracket formed by a vertical plate 9, having a horizontal extension 10 at its lower end, which is drilled and tapped to receive the adjusting set-screw 11. The upper end of the plate 9, it will be noted, is formed with two extensions or ears 12 and 13. These ears or extensions are apertured at 14 and 15, respectively, to receive the ends of the headless bolts 16, which are rigidly secured within the apertures. The free ends of the bolts 16 are threaded, the threads thereof meshing with the threads on the nuts 17, whereby the clamping members 18 sliding on the bolts 16 may be adjusted.

In the application of the attachment to the channel bar 7 of the vehicle frame, the inner face of the plate 9 is placed against the outer surface of the channel bar, as clearly shown in Fig. 1, after which the extension 19 of the clamping member 18 is engaged with the top of the channel bar by tightening the nut 17 on the bolt 16, the nut being secured against becoming loosened by the employment of a lock washer 20. When this has been done, the adjusting set-screw 11 is then screwed home against the underside of the channel bar, whereby the attachment is firmly and rigidly clamped to the channel bar against movement in any direction, the set-screw 11 obviating movement in a vertical plane; while the clamp 18 prevents movement in a horizontal plane.

The extensions or arms 8ª of the bumper are drilled or apertured so that the threaded studs 21 and 22 adapted for seating within suitable threaded apertures in the plate 9 may be passed. It will be noted that the studs 21 and 22 are located in an inclined plane to facilitate the adjustment of the bumper and bring it into proper operative position. To coöperate with the studs 21 and 22, I have found it desirable to provide an elongated slot in the arm or extension 8ª of the bumper, which slot is shown at 8ᵇ in dotted line in Fig. 2. This affords a considerable range of vertical movement for the bumper and permits of the application of the attaching device to the curved or inclined surface of the nose of the frame, if such should be found necessary, the bumper at all times being maintained in a substantially horizontal plane.

As will be manifest from the description and illustration of the embodiment of my invention herein shown, any impact delivered against the bumper 8 will be absorbed thereby to a considerable extent, such strain or stress as may be incident thereto being transmitted to the attaching devices and by the four-point engagement thereof with the channel bar distributed longitudinally of the frame of the vehicle.

Having thus described my invention what I claim as new herein and desire to secure by Letters Patent is:

1. In combination with a motor vehicle frame of channel form, a bumper, and means for attaching the bumper to the frame, said means consisting of a plate adapted to lie against the web of the frame and having a right angular extension projecting beneath the lower flange of the frame, a set-screw carried by said extension, a pair of bolts carried by said plate, clamping members slidably mounted on said bolts and means in engagement with said bolts and adapted to coöperate with said clamping members to function the same.

2. In combination with a channel frame of a motor vehicle, a bumper and means for rigidly securing the bumper to the frame, said means comprising a plate adapted to lie in contact with the web of the frame member, and having a right-angular extension projecting beneath the lower flange of said frame member and provided with a set-screw adapted to engage with said flange, a clamping member, means carried by said plate for supporting and guiding the movement of said clamping member and means carried by said supporting means for functioning said clamping member to engage the upper flange of the frame member.

3. In combination with the longitudinal frame members of a motor vehicle, a bumper and means for attaching said bumper to said frame members, whereby said bumper will substantially constitute a continuation of said frame members, said attaching means comprising a bracket having a fixed and two movable points of engagement with the frame member to rigidly clamp said bracket to said frame member, and means carried by said bracket and independent of said clamping means for fastening the bumper to said bracket, whereby the force of an impact delivered to said bumper will be dissipated through said bracket and the frame of the vehicle.

4. A bracket for attaching a bumper to the frame of a vehicle, comprising a flat plate adapted to lie against the web of the channel frame member and having ears projecting above the plane of the upper flange of said member, bolts fixed in said ears, clamping members freely movable on said bolts for engagement with the adjacent flange of the frame member, securing nuts in threaded engagement with said bolts for locking said plate and said clamping members to said frame member against lateral movement, an extension on said plate projecting beneath the lower flange of said member and means seated therein to engage said flange to lock said bracket against vertical movement.

5. A bracket for attaching a bumper to the frame of a vehicle, comprising a flat plate adapted to lie against the web of the channel frame member and having ears projecting above the plane of the upper flange of said member, bolts fixed in said ears and bearing upon the upper surface of the upper flange of said frame member, clamping devices having free movement on said bolts to engage the under surface of the adjacent flange of the frame member, nuts in threaded engagement with said bolts for locking said plate and said clamps to said frame members against lateral movement; an extension of said plate projecting beneath the lower flange of said frame member and adjustable means carried thereby to engage said flange whereby said bolts and the clamps carried thereby will coöperate with said means to lock said bracket against vertical movement.

6. In combination with a channel frame of a motor vehicle, a bumper and a bracket for attaching the bumper to said frame, whereby said bumper will be in effect a continuation of said frame, said bracket comprising a plate adapted to lie against the web of the frame and having upwardly extending ears, bolts carried by said ears and adapted to lie upon the upper flange of the frame, clamping members movable on said bolts to engage the adjacent flange of the frame, an extension formed on said plate to project beneath the lower flange of the frame and adjustable means on said bolts and on said extension to rigidly lock said bracket to said frame against movement relative thereto, and means for fastening the bumper to the outer face of said plate.

ARTHUR MAYER.